(12) United States Patent
Boghani

(10) Patent No.: US 11,995,589 B2
(45) Date of Patent: May 28, 2024

(54) SYSTEM AND METHOD FOR PROCESSING REQUIREMENTS IN ERP AND HRIS

(71) Applicant: Wolka Technologies LLC, Lewisville, TX (US)

(72) Inventor: Aly Boghani, Lewisville, TX (US)

(73) Assignee: Wolka Technologies, LLC, Lewisville, TX (US)

( * ) Notice: Subject to any disclaimer, the term of this patent is extended or adjusted under 35 U.S.C. 154(b) by 0 days.

(21) Appl. No.: 18/116,887

(22) Filed: Mar. 3, 2023

(65) Prior Publication Data
US 2023/0359964 A1 Nov. 9, 2023

Related U.S. Application Data

(60) Provisional application No. 63/338,529, filed on May 5, 2022.

(51) Int. Cl.
G06Q 10/0631 (2023.01)

(52) U.S. Cl.
CPC .............................. G06Q 10/06315 (2013.01)

(58) Field of Classification Search
CPC .. G06Q 10/06315; G06Q 30/02; G07F 19/00; G06F 16/21
See application file for complete search history.

(56) References Cited

U.S. PATENT DOCUMENTS

| | | | | |
|---|---|---|---|---|
| 11,372,828 B1* | 6/2022 | Bendapudi | ............ | G06F 16/258 |
| 2007/0250417 A1* | 10/2007 | Lane | ...................... | G06Q 30/02 |
| | | | | 705/30 |
| 2010/0100561 A1* | 4/2010 | Cooper | .................. | G06Q 10/10 |
| | | | | 707/769 |
| 2013/0073387 A1* | 3/2013 | Heath | .................... | G06Q 30/02 |
| | | | | 705/14.53 |
| 2017/0168665 A1* | 6/2017 | Hock | ..................... | G06F 16/254 |
| 2017/0169099 A1* | 6/2017 | Hock | .................. | G06F 16/2423 |
| 2022/0036302 A1* | 2/2022 | Cella | .................. | G06Q 10/0834 |

(Continued)

Primary Examiner — Rutao Wu
Assistant Examiner — Stephen S Swartz
(74) Attorney, Agent, or Firm — MUGHAL GAUDRY & FRANKLIN PC

(57) ABSTRACT

A system and method for processing requirements in an enterprise resource planning (ERP)/human resources information system (HRIS)/human capital management (HCM) are disclosed. The system comprises a computing device having a processor and a computer-readable medium to store a set of instructions executed by the processor, a database for storing a plurality of requirements from the documents or spreadsheets, and a user virtual machine device to perform different tasks across different modules of ERP/HRIS/HCM. The processor maps the configuration requirements to an ERP/HRIS/HCM instance and provides ability to configure, validate, compare against different environments/instances, and test at the speed, frequency, and precision provided the scale of complexity within configuration requirements and instances. Further, Robotic process automation (RPA) is configured to process the requirements in the ERP/HRIS/HCM systems for automation. The system also provides a complete blueprint of the overall ERP/HRIS/HCM landscape. The system eliminates human error by automating the coding/configuration.

9 Claims, 4 Drawing Sheets

(56) References Cited

U.S. PATENT DOCUMENTS

2023/0109260 A1\* 4/2023 Bald ................... G06N 3/088
  706/21
2023/0222531 A1\* 7/2023 Cella ............... G06Q 10/06315
  705/7.31

\* cited by examiner

SYSTEM AND METHOD FOR PROCESSING REQUIREMENTS IN ERP AND HRIS

CROSS-REFERENCE TO RELATED APPLICATION

The present application claims the benefit of U.S. provisional application U.S. 63/338,529 filed on 5 May 2022 entitled "SYSTEM AND METHOD FOR PROCESSING REQUIREMENTS IN ERP AND HRIS", the contents of which are hereby incorporated by reference.

BACKGROUND OF THE INVENTION

A. Technical Field

The present invention generally relates to an automation tool. More specifically, the present invention relates to a system and method for managing configuration state and processing requirements automatically in an enterprise resource planning (ERP)/human resources information system, (HRIS)/human capital management system, and (HCM)/human experience management (HXM). Also, the present invention is configured to perform comparison and validation between different instances.

B. Description of Related Art

Automation tools are software applications used for testing various applications. These are installed in various applications for automatic operations. One such application is ERP. In ERP, these automation tools are used for removing manual interventions and errors in performing the task and other functions. Many businesses today require automation tools to work faster and easier.

The existing system needs manual creation of workbook that shows what is currently configured in the system. This system requires manual effort and expertise to analyze any reports or visualization of instance requirements. It necessitates manual effort and expertise to locate, configure, and document within the system. All functions such as configuration, comparison with other environments/instances, validation against an instance, and testing were entirely manual processes.

Few existing patent references attempted to address problems cited in the background as prior art over the presently disclosed subject matter are explained as follows:

U.S. Pat. No. 11,138,540 B2 of Jayaraman Krishnamurthy, titled "Creating digital workers in organizations," discloses the creation of digital workers to perform at least one automated task upon request. The digital worker may be created in an organization upon receiving the request. For example, digital worker may be a computer program to perform the at least one automated task. Credentials may be generated for the created digital worker. The credentials associated with the created digital worker may be updated in the organizations' employee directory. The digital worker may be enabled to perform the at least one automated task upon updating the credentials in the organizations' employee directory.

U.S. Patent Publication No. 2021/0182996 A1 of Charles Howard Cella et. al., titled "Control tower and enterprise management platform with information from internet of things resources about supply chain and demand management entities." discloses an information technology system including a cloud-based management platform with a microservices architecture having a set of microservices layers including an application layer supporting at least one supply chain application and at least one demand management application. The microservices layers can include a data collection layer that can collect information from a set of Internet of Things resources that collect information with respect to supply chain entities and demand management entities related to the value chain network entities of the platform.

U.S. Patent Publication No. 2021/0374479 A1 of Humberto Zambetti, et al., titled "Intelligent payment processing platform system and method," discloses a system and method of automating payment processing. Payment documents can be processed using an array of tools including artificial intelligence integrated with the end-user's own ERP architecture. The proposed implementations maintain a logical segregation of the documents, which may include the processing of receipts, validation of documents against ERP information, tax analysis, posting of documents, as well as real-time monitoring and support of settlement and accounts payable operations. Embodiments of this approach utilize enhanced optical character recognition (OCR) techniques in conjunction with robotic process automation (RPA) and Machine Learning to produce a platform capable of enabling these processes to run end-to-end with little to no human intervention or error.

Though the existing prior art discloses various systems for processing requests automatically in ERP, none disclose a system that gives the ERP/HRIS Administrators or ERP/HRIS/HCM consultants the ability to configure, test, compare with different environments/instances, and validate across iterations/instances in ERP. Further, a system that processes a request from a spreadsheet or document in ERP/HRIS automatically is not disclosed.

In light of the above-mentioned drawbacks, there is a need for a system and method to process requests in an ERP/HRIS/HXM. Also, there is a need for a system to process requirements automatically in an enterprise resource planning (ERP)/human resources information system (HRIS)/human capital management system (HCM). Further, there is a need for a system that aids in the implementation and sustainment activities of ERP/HRIS/HCM systems. Such system of the present invention is configured to perform comparison and validation between different environments/instances, thereby reducing time and effort after every release, future risks, and operational gaps.

SUMMARY OF THE INVENTION

The present invention generally discloses a computer-implemented system and method for processing responses in an enterprise resource planning (ERP)/human resources information system (HRIS)/human capital management (HCM). The present invention further discloses a system and its methodology that aids in the implementation and sustainment activities of ERP/HRIS/HCM systems.

According to one embodiment, the system is executed in a network environment for processing the requirements in ERP/HRIS/HCM. In one embodiment, the system is an automation tool utilized for applications and products in data processing (SAP) SuccessFactors ERP/HRIS/HCM. The system runs in the cloud computer-implemented environment configured to process requirements from a document/spreadsheet automatically using robotic process automation (RPA). In one embodiment, the system is designed for ease of use and to maximize the configuration information visible to Administrators and Consultants with help of spreadsheets or dashboard. In one embodiment, the system may be an application software, a mobile application, a web-based application, or a desktop application.

In one embodiment, the network environment comprises one or more user virtual machine devices and a response management system. Each user virtual machine device is associated with a user. In one embodiment, the user virtual machine device is installed with a dedicated web application or application software. In one embodiment, the user virtual machine device is deployed with a set of instructions or bots (i.e., CodeBot). In one embodiment, the user virtual machine device receives the set of instructions from a spreadsheet and it updates the web application or database with the configuration steps, validation, etc. In one embodiment, the web application or software application is accessible via the user virtual machine device. In one embodiment, the user virtual machine device enables the user to access one or more services provided by the system. In one embodiment, the user virtual machine device communicates with the response management system via a communication network. In one embodiment, the user virtual machine device is enabled to access the response management system via the network. In one embodiment, the user virtual machine device is at least any one of a smartphone, a mobile phone, a tablet, a laptop, a desktop, and/or other suitable hand-held electronic communication devices. In one embodiment, the user virtual machine device comprises a storage medium in communication with the network to access the response management system.

In one embodiment, the response management system comprises a server or computing device and one or more databases in communication with the computing device or webserver. In one embodiment, the computing device may be a cloud server or combination of multiple cloud servers or combination of virtual machines. In one embodiment, the database is in communication with the computing device via the network. In one embodiment, the database is accessible by the server. In one embodiment, the computing device comprises a processor and computer-readable medium or memory unit coupled to the processor. The memory unit stores a set of instructions executable by the processor configured to process the response from the documents and spreadsheet to ERP/HRIS/HCM.

In one embodiment, the system is specific to uniquely map the configuration requirements to the ERP/HRIS/HCM instance. In one embodiment, the system has an ability to configure, validate, compare, and test at speed, frequency, and precision provided the scale of complexity within configuration requirements and instances. The system ability may be combined with an opensource RPA technology. In one embodiment, the configuration is automated to eliminate human errors, provide efficiency and scalability.

In one embodiment, the system is used to aid in the implementation, support, and sustainment activities of ERP/HRIS/HCM systems. The system validates, compares, configures, and documents unit test requirements in the spreadsheet with ERP/HRIS/HCM instances during pre-release and post-release. In one embodiment, the system bridges the configuration requirements, typically a workbook or through a dashboard, with the platform or cloud instance. In one embodiment, the configuration requirements are reverse engineering from the platform/cloud instance. The system gives end-users the ability to validate, compare, and test across iterations/instances. In one embodiment, the system is configured to perform comparison and validation between different environments/instances. In one embodiment, the system is configured to perform comparison and validation between different instances for cloud-based ERP/HRIS/HCM like SAP SuccessFactors, Workday, Oracle, and any HXM platform. In one embodiment, the system is configured to perform comparison and validation between different instances, thereby reducing time and effort after every release, future risks, and operational gaps. Further, the system enables strategic consulting on these ERP/HRIS/HCM systems by providing a global view of the system landscape.

In one embodiment, the system is further combined with robotic process automation (RPA) technology. In one embodiment, the system takes requirements from a document/spreadsheet and instructs the Bot/RPA to configure requirements in the ERP/HRIS/HCM systems. In one embodiment, the system further provides a complete blueprint of the overall ERP/HRIS/HCM landscape. In one embodiment, a large task is split into smaller tasks managed by multiple simultaneous bots. These multiple bots accomplish the tasks in a fraction of the time. In one embodiment, the system is designed for ease of use and to maximize the configuration information visible to end-users, administrators, or consultants. This enables them to understand the system landscape more quickly.

In one embodiment, the system is a SaaS operated by logging into the web application with tile-modules, workspaces, and a handful of action buttons. In one embodiment, the system enables the users to trigger bot(s) to perform different tasks across different modules of ERP/HRIS/HCM. The system leverages spreadsheet, for example, google sheets/excel online/smart sheets, to document requirements. In one embodiment, the users can change the requirements directly in spreadsheets online and trigger bots to perform configuration, validation, comparison, and documentation of requirements from/in the instance.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION OF EMBODIMENTS

A description of embodiments of the present invention will now be given with reference to the Figures. It is expected that the present invention may be embodied in other specific forms without departing from its spirit or essential characteristics. The described embodiments are to be considered in all respects only as illustrative and not restrictive.

Figure 1:
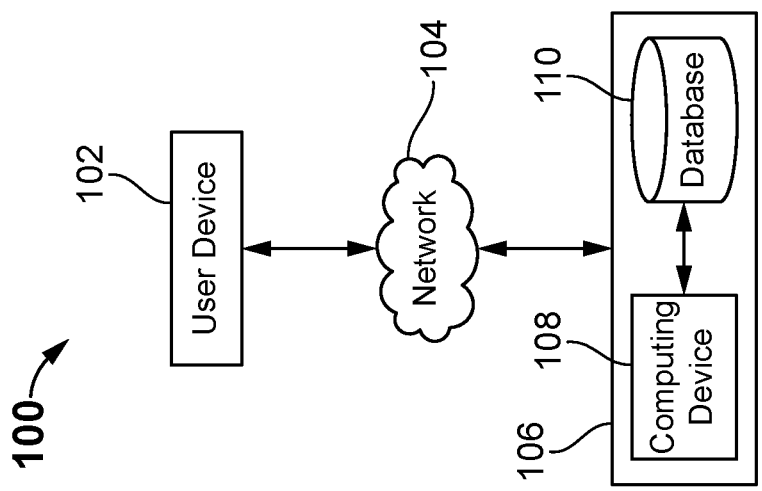
FIG. 1 shows a computer-implemented system executed in a network environment configured to process one or more requirements in an enterprise resource planning (ERP)/human resources information system (HRIS)/human capital management (HCM) in an embodiment of the present invention.

Referring to FIG. 1, a computer-implemented system executed in a network environment 100 for processing the requirements in an enterprise resource planning (ERP)/human resources information system (HRIS)/human capital management (HCM)/human experience management (HXM) is illustrated. In one embodiment, the system is an automation tool utilized for applications and products in data processing (SAP) SuccessFactors, Workday, Oracle, HXM platform, and other ERPs/HRIS/HCM systems. The system runs in the computer-implemented environment 100 configured to process requirements from a document/spreadsheet automatically using robotic process automation (RPA). In one embodiment, the system is designed for ease of use and to maximize the configuration information visible to end-users. In one embodiment, the system may be an application software, a mobile application, a web-based application, or a desktop application.

In one embodiment, the network environment 100 comprises one or more user virtual machine devices, cloud systems, or virtual machines 102. Each user virtual machine device or virtual machine 102 is associated with a user. In one embodiment, the user virtual machine device or virtual machine 102 is installed with the dedicated web application or application software. In one embodiment, the user virtual machine device 102 is deployed with a set of instructions or bots (i.e., CodeBot). In one embodiment, the user virtual machine device 102 receives the set of instructions from a spreadsheet and updates the web application or database with the configuration steps, validation, etc. In one embodiment, the web application or software application is accessible via the user virtual machine device 102. In one embodiment, the user can log into the application software by registration/logging-in using one or more user credentials. The system further comprises a communication network 104 and a response management system 106. In one embodiment, the user virtual machine device 102 is enabled to access the response management system 106 via the network 104. In one embodiment, the user virtual machine device 102 enables the user to access one or more services provided by the system. In one embodiment, the user virtual machine device 102 is at least any one of a smartphone, a mobile phone, a tablet, a laptop, a desktop, and/or other suitable hand-held electronic communication devices. In one embodiment, the user virtual machine device 102 comprises a storage medium in communication with the network 104 to access the response management system 106. In an embodiment, the network 104 could be Wi-Fi, WiMAX, wireless local area network (WLAN), satellite networks, cellular networks, private networks, and the like.

In one embodiment, the response management system 106 comprises a computing device 108 and one or more databases 110 in communication with the computing device 108. In one embodiment, the computing device 108 is a server. In one embodiment, the computing device 108 could be a cloud server. In one embodiment, the server could be operated as a single computer. In some embodiments, the computer could be a touchscreen and/or non-touchscreen and adopted to run on any type of OS, such as iOS™, Windows™, Android™, Unix™ Linux™, AWS Amazon Linux 2, and/or others. In one embodiment, the plurality of computers is in communication with each other via networks. Such communication is established via any one of application software, mobile application, browser, OS, and/or any combination thereof.

In one embodiment, the database 110 is in communication with the computing device 108 via the network 104. In one embodiment, the database 110 is accessible by the computing device 108. In another embodiment, the database 110 is integrated into the computing device 108 or separate from it. In some embodiments, the database 110 resides in a connected server or a cloud computing service. Regardless of location, the database 110 comprises a memory to store and organize certain data for use by the computing device 108. In one embodiment, the database 110 is configured to store a plurality of requirements from one or more documents or spreadsheets.

In one embodiment, the computing device 108 comprises a processor and a computer-readable medium or memory unit coupled to the processor. The memory unit stores a set of instructions executable by the processor configured to perform implementation and sustainment activities of ERP/HRIS/HCM. The memory unit could be RAM and ROM (including EPROM, EEPROM, PROM). In one embodiment, the user virtual machine devices 102 are configured to access the services provided by the computing device 108 via the network 104. In one embodiment, the computing device 108 is configured to process the requirements from the document or spreadsheet in the ERP/HRIS/HCM and instructs the Bot/RPA (Robotic process automation) to configure requirements in the ERP/HRIS/HCM systems.

In one embodiment, the system is specific to uniquely map the configuration requirements to the ERP/HRIS/HCM instance. In one embodiment, the system has an ability to configure, validate, compare, and test at the speed, frequency, and precision provided the scale of complexity within configuration requirements and instances. The system ability may be combined with an existing RPA technology. In one embodiment, the configuration is automated to eliminate human errors.

In one embodiment, the system is used to aid in the implementation, support, and sustainment activities of ERP/HRIS/HCM systems. The system validates, compares, configures, and documents unit test requirements in the spreadsheet with ERP/HRIS/HCM instances during pre-release and post-release. In one embodiment, the system bridges the configuration requirements, typically a workbook consisting of one or more worksheets, with the platform or cloud instance. In one embodiment, the configuration requirements are reverse engineering from the platform/cloud instance. The system gives end-users the ability to validate, compare, and test across iterations/instances. In one embodiment, the system is configured to perform comparison and validation between different instances. In one embodiment, the system is configured to perform comparison and validation between different instances for cloud-based ERP/HRIS/HCM like SAP SuccessFactors, Workday, Oracle, and HXM platform. In one embodiment, the system is configured to perform comparison and validation between different instances, thereby reducing time and effort after every release, future risks, and operational gaps. Further, the system enables strategic consulting on these ERP/HRIS/HCM systems by providing a global view of the system landscape.

In one embodiment, the system is further combined with robotic process automation (RPA) technology. In one embodiment, the system takes requirements from a document/spreadsheet and instructs the Bot/RPA to configure requirements in the ERP/HRIS/HCM/HXM systems. In one embodiment, the system further provides a complete blueprint of the overall ERP/HRIS/HCM/HXM landscape. In one embodiment, a large task is split into smaller tasks managed by multiple simultaneous bots. These multiple bots accomplish the tasks in a fraction of the time. In one embodiment, the system is designed for ease of use and to maximize the configuration information visible to end-users, administrators, or consultant. This enables them to understand the system landscape more quickly.

In one embodiment, the system is a SaaS operated by logging into the web application with tile-modules, workspaces, and handful of action buttons. In one embodiment, the system enables the users to trigger bot(s) to perform different tasks across different modules of ERP/HRIS/HCM/HXM. The system leverages spreadsheets, for example, google sheets/excel/open-source spreadsheet, to document requirements. In one embodiment, the users can change the requirements directly in spreadsheets and trigger bots to perform configuration, validation, comparison, and documentation of requirements from/in the instance.

Figure 2:
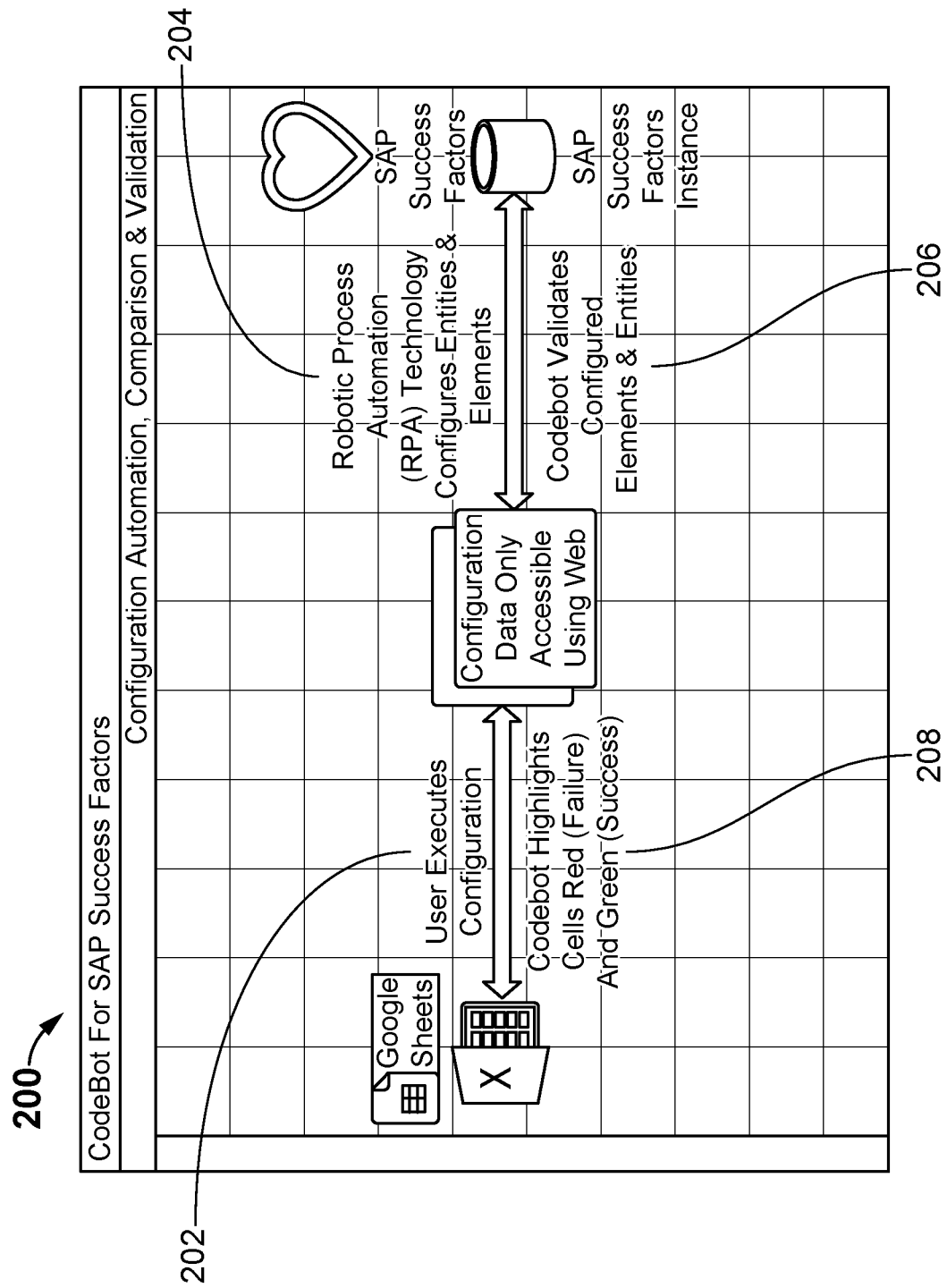
FIG. 2 shows a schematic flow diagram of configuration automation, comparison, and validation in one embodiment of the present invention.

Referring to FIG. 2, a schematic flow diagram 200 of a process of configuration automation, comparison, and validation are illustrated. The process utilizes a combination of RPA, API, and some proprietary methods. In one embodiment, the configuration and validation are done using RPA technology. The process performs the following steps. At step 202, the user executes the set of instructions that perform the configuration. At step 204, the RPA configures the data such as entities and elements. At step 206, the set of instructions validate the configuration data such as elements and entities. In one embodiment, the configuration data is accessible using the web. At step 208, the set of instructions highlights one or more cells in the workbook. The cells are highlighted in different colors to represent 'failure' and 'success'. In one embodiment, one or more cells are highlighted in red color to represent 'failure'. In one embodiment, one or more cells are highlighted in green color to represent 'success'.

Figure 3:
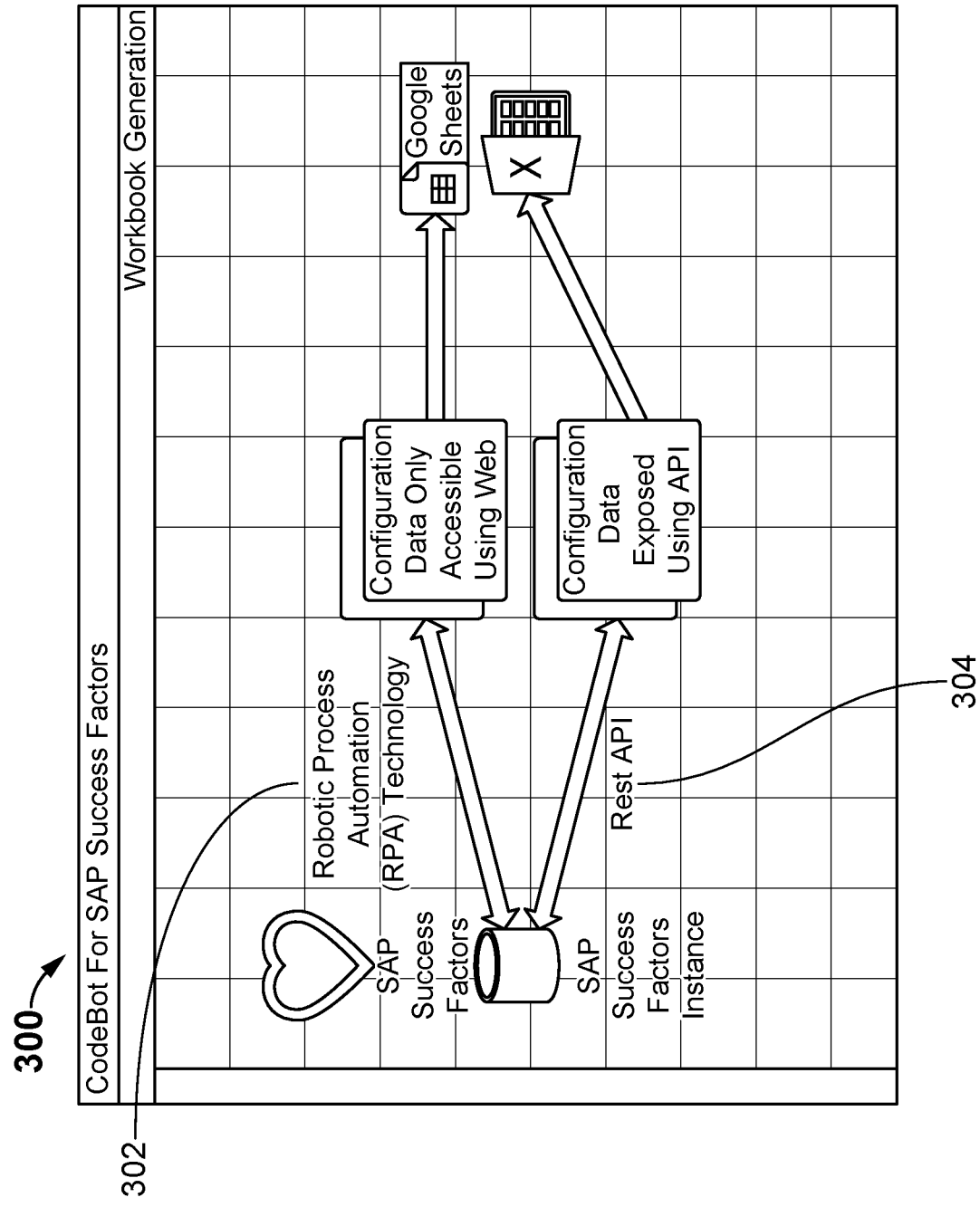
FIG. 3 shows a schematic flow diagram of workbook generation in one embodiment of the present invention.

Referring to FIG. 3, a schematic flow diagram 300 of workbook generation is illustrated. In one embodiment, the user generates the workbook. In one embodiment, the user generated workbook comprises a username to access the SAP SuccessFactors. The workbook generation comprises the following steps. At step 302, the workbook is generated using RPA technology. The configuration data utilized during workbook generation could be accessible only by the web. At step 304, the workbook is generated using rest API. In one embodiment, the configuration data is exposed using API.

Figure 4:
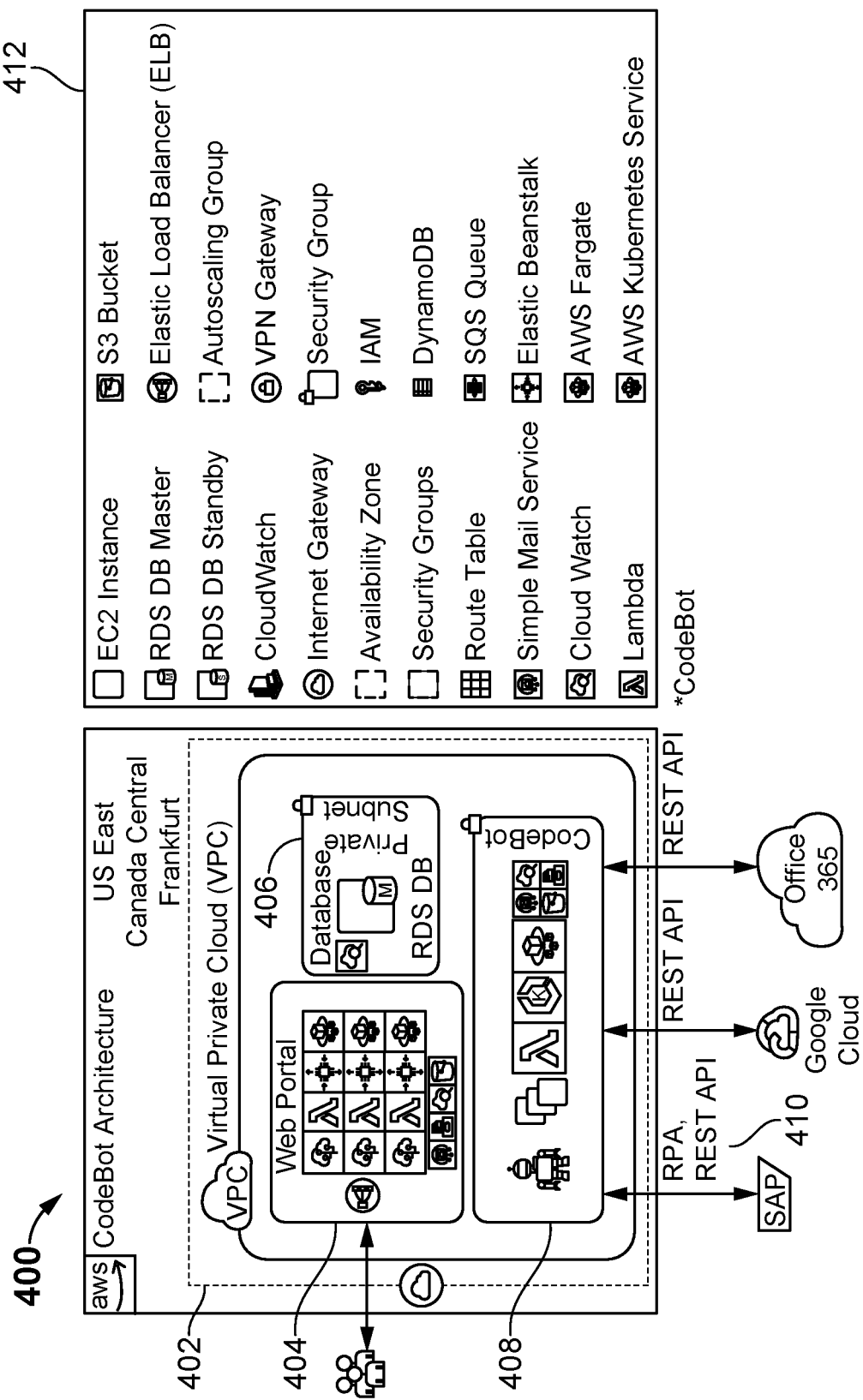
FIG. 4 shows an architecture of SAP SuccessFactors in one embodiment of the present invention.

Referring to FIG. 4, an architecture 400 of SAP SuccessFactors is illustrated. The architecture 400 comprises a virtual private cloud (VPC) system 402. In one embodiment, the VPC 402 comprises one or more modules including, but not limited to, a web portal 404, at least one database 406, and a set of instructions (i.e., CodeBot) 408. The user may communicate with the VPC 402 via the web portal 404. In one embodiment, the database 406 may be Relational Database Service (RDS). In one embodiment, the set of instructions update the web application or database with the configuration steps, validation, etc. Further, the VPC 402 communicates with the SAP Cloud based spreadsheet tool like Google Cloud, Office 365, etc. via RPA and rest API 410. In one embodiment, the architecture 400 further comprises a plurality of data processing options 412. The plurality of data processing options includes, but is not limited to, EC2 Instance, RDS DB Master, RDS DB Standby, Cloud Watch, Internet Gateway, Availability Zone, Security Groups, Route Table, Simple Mail Service, Cloud Watch, Lambda, S3 Bucket, Elastic Load Balancer (ELB), Autoscaling Group, VPN Gateway, Security Group, IAM, Dynamo DB, SQS Queue, Elastic Beanstalk, AWS Fargate, and AWS Kubernetes Service.

Advantageously, the system of the present invention saves time, which in turn saves money. It also helps to realize the acceleration/adoption of the ERP/HRIS/HCM/HXM solution faster than the existing systems. The system further eliminates human error as coding/configuration is automated. By eliminating redundant tasks, the system also makes performing the work more enjoyable.

Preferred embodiments of this invention are described herein, including the best mode known to the inventors for carrying out the invention. It should be understood that the illustrated embodiments are exemplary only and should not be taken as limiting the scope of the invention.

The foregoing description comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings in the foregoing descriptions. Although specific terms may be employed herein, they are used only in generic and descriptive sense and not for purposes of limitation. Accordingly, the present invention is not limited to the specific embodiments illustrated herein.

What is claimed is:

1. A system for processing a set of requirements in an enterprise resource planning (ERP)/human resources information system (HRIS) /human capital management (HCM), wherein the system is a Software as a Service (SaaS) operated by logging into a web application with one or more tile-modules, one or more workspaces, and a plurality of action buttons, comprising:
   a computing device having a processor and a computer-readable medium coupled to the processor, the computer-readable medium comprises a set of instructions executable by the processor configured to perform implementation and sustainment activities of ERP/HRIS/HCM, wherein the system is in communication with the computing device through a communication network;
   one or more databases in communication with the computing device via the communication network configured to store a plurality of configuration requirements from a configuration workbook, wherein the configuration workbook comprises one or more documents or spreadsheets generated automatically via a robotic processing automation (RPA) technology and rest API; and
   one or more user virtual machine devices associated with a user in communication with the computing device via the communication network configured to perform different tasks across different modules of ERP/HRIS/HCM, wherein the processor is configured to:
map the plurality of configuration requirements, via the RPA technology, from the configuration workbook to one or more ERP/HRIS/HCM instances, wherein the RPA technology splits a large task into smaller tasks managed by a plurality of simultaneous bots;
provide a blueprint of ERP/HRIS/HCM landscape; and
provide an ability to configure, validate, compare, document unit test requirements in a spreadsheet with the one or more ERP/HRIS/HCM instances and test at a speed, a frequency, and with a precision provided in a scale of complexity within the plurality of configuration requirements and the one or more ERP/HRIS/HCM instances, wherein the system connects the plurality of configuration requirements with a platform or a cloud instance, and wherein the plurality of configuration requirements are reverse engineering from the platform or the cloud instance.

2. The system of claim 1, wherein the processor is configured to further provide the ability to configure, validate, compare against different environments/instances, and test a large scale and complex configuration requirements in the spreadsheet, a dashboard or a report with the one or more ERP/HRIS/HCM instances.

3. The system of claim 1, wherein the one or more user virtual machine devices is are configured to communicate with the computing device via the communication network using an application software or mobile application or web-based application, or desktop application executed in a computer-implemented environment or network environment.

4. The system of claim 1, wherein a configuration is automated to eliminate redundant tasks and human errors and the system is utilized for SAP SuccessFactors, Workday, Oracle HCM or HXM platform.

5. The system of claim 1, wherein the set of instructions accomplish various tasks in a fraction of a time.

6. The system of claim 1, wherein the processor is configured to maximize a configuration information visible to end-users.

7. The system of claim 1, allows users to trigger the set of instructions to perform the different tasks across the different modules of ERP/HRIS/HCM/HXM.

8. The system of claim 1, allows users to change the set of requirements directly in the spreadsheet and trigger the set of instructions to perform configuration, validation, comparison, and documentation of requirements in the one or more ERP/HRIS/HCM instances.

9. The system of claim 1, wherein the one or more user virtual machine devices are at least any one of a smartphone, a mobile phone, a tablet, a laptop, a desktop, and /or other suitable hand-held electronic communication devices.

\* \* \* \* \*